May 15, 1951  C. R. ROCHE  2,553,006

DRIVING MECHANISM

Filed March 26, 1945

Inventor:
CLIFTON R. ROCHE
Parker & Burton
ATTORNEYS

Patented May 15, 1951

2,553,006

UNITED STATES PATENT OFFICE 2,553,006

DRIVING MECHANISM

Clifton R. Roche, Los Angeles, Calif.

Application March 26, 1945, Serial No. 584,758

12 Claims. (Cl. 74—337)

My invention relates to driving mechanisms and more particularly to overrunning clutch mechanisms, often called one-way-drive clutches, or free-wheeling devices. The invention is particularly adaptable to devices in which one shaft is driven by another shaft through a set of helical gears. The thrust force caused by driving through helical gears is used to shift a clutch into and out of engagement, depending upon the direction of the thrust force, which will change with the direction of the drive. It is not necessary that the clutch be of friction type, but may be a positive type clutch such as one having one set of teeth meshing coaxially with a second set of teeth. The clutch may be made controllable by providing any means that will overcome the said thrust force and hold the clutch either into or out of engagement. Thus, if the thrust force is allowed to operate the clutch, the device will operate as a free-wheeling device; if the controlling means is set to hold the clutch in engagement, the free-wheeling will be locked out, and drive may be had in either direction; and if the controlling means is set to hold the clutch out of engagement the drive will be broken no matter what the direction may be.

Such a device is very suitable for many types of transmissions, especially automatic transmissions; also in connection with the controls necessary when a fluid flywheel is used in cooperation with a transmission, such as in my application Number 407,830, filed on the 21st day of August 1941, now Patent No. 2,394,331 dated February 5, 1946.

The present application is a continuation in part of my prior application Serial Number 372,313, filed on the 30th day of December, 1940, now Patent No. 2,375,440 dated may 8, 1945.

One of the objects of my invention is to provide an overrunning clutch of simplified form, capable of high load capacities, and one that may use a positive type clutch that does not depend upon friction as a driving means.

A further object of my invention is to provide an overrunning clutch that is controllable so that it may be used as a one-way-drive clutch, a two-way-drive clutch, or as a clutch that can be held in continuous disengagement regardless of the direction of the drive.

A further object of my invention is to provide an over-running clutch with a controlled engagement so that the engagement will occur when the clutch elements are rotating at the same rate of speed, thereby preventing a clash or jerk when the clutch engages.

Further objects and advantages of the invention will appear hereinafter.

The invention consists in novel parts and combination of parts to be described hereinafter, a preferred embodiment of which is described in the following specification, while the broad scope of the invention is pointed out in the appended claims.

In the drawing which is for illustrative purpose only:

Figure 1:
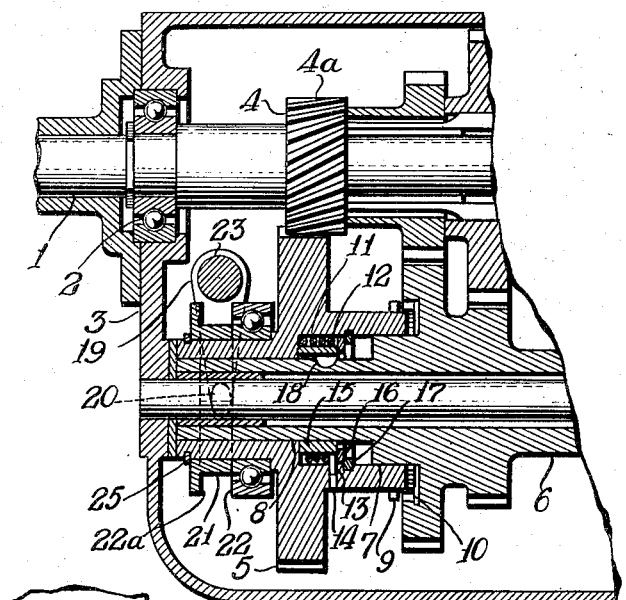
Fig. 1 is a partial vertically longitudinally sectioned view through a transmission including, and showing a preferred embodiment of my invention.

Referring to the drawing, my invention includes a drive member 1, rotatively mounted in a bearing 2, carried in a transmission housing 3. The drive member is made to include a drive member gear 4, with left hand helical teeth 4a, which mesh with the teeth of a driven gear 5. The driven gear is mounted on a driven shaft, or member 6 by bearings 7 and 8 and can rotate, and also slide axially, on these bearings. A clutch element 9, is on the driven gear, and a companion clutch element 10 is on the driven shaft. When the driven gear is moved to the right, the clutch elements become engaged in a driving connection, and when the driven gear is moved to the left, the clutch elements become disengaged and there is no appreciable driving connection between the driven gear and the driven shaft. If the drive member (or drive gear) is turned in a clockwise direction, when viewed from the left, the angle of the teeth will cause a thrust to be exerted on the driven gear, forcing it to the right, engaging the clutch elements and thereby driving the driven shaft. However, if the driven gear tends to rotate at a greater speed than that which is caused by the speed of rotation of the drive gear, the thrust due to the angle of the teeth will move the driven gear to the left, disengaging the clutch elements, and thereby allowing the drive to free-wheel.

As the magnitude of the thrust force is dependent upon the driving load, it is desirable for the driven gear, or such free member, to offer some resistance to the drive gear, and not turn absolutely free on the bearings 7 and 8. To cause such a resistance a brake 11, may be employed to resist the turning of the driven gear in respect to the driven shaft. This brake, however, should not cause resistance to the sliding action of the driven gear, and preferably the brake should have little or no braking action when the device is free-wheeling. To accomplish this, I provide a coil spring 12, which has one end 13, bent so as to be locked in a hole 14 in the driven gear. The coils of the spring lightly grip the outside surface of a member 15. The member is free to slide axially with the driven gear, and is held in place by a washer 16 and a snap ring 17. The member is held to rotate with the driven shaft by a key 18. The coils of the springs are wound in such a direction that when the relative turning between the driven shaft and the driven gear is in the free-wheeling direction, the coils will tend to uncoil, offering little or no appreciable braking action, but when the relative turning is reversed, the coils tend to tighten around the outer surface of the member 15, causing a much greater braking action. If the drive member is rotated in a clockwise direction when viewed from the left, the braking action will prevent relative rotation between the driven gear and driven member, however, there will be no resistance to the axial movement of the driven gear, and the clutch will therefore engage when the driven gear and driven member are rotating at the same speed. Therefore, the clutch elements are rotating at the same speed at engagement and no clash or jerk will occur.

It can now be understood that the brake 11 and its associated parts cooperate as a relatively small capacity one-way-drive clutch which is employed to energize a relatively large capacity clutch that takes the driving load.

While I have shown the relatively small capacity one-way-drive clutch as one of a spring type, there are many other types of such clutches that could be substituted therefore.

In order to control the clutch action, I provide a shifting fork 19, which has projections 20, that project into a recess 21. The recess has a thrust surface 22a, and a thrust bearing 22, against which the projections may act. The shifting fork is mounted on a shaft 23, which extends through the housing, and a shifting lever 24 is mounted on the shaft outside the housing. The thrust surface and thrust bearing are held on the driven gear by a snap ring 25.

If the shifting lever is held in a position to the right, the shifting fork will act upon the surface of the thrust bearing and hold the clutch in the engaged position. Thus free-wheeling is locked out and a drive will be had in either direction. If, on the other hand, the shifting lever is held in a position to the left, the shifting fork will act upon the thrust surface and hold the clutch in a disengaged position, and there can be no drive in either direction. If the shifting lever is not held in either the position to the right or to the left, the clutch will become automatically engaged or disengaged according to the direction of the thrust force due to the reaction of the helical gears and free-wheeling will occur as has been previously explained.

It should be pointed out that when the clutch is held in the disengaged position, the brake 11 may be made with so little friction as to be negligible so far as acting as a driving means for the driven member and yet function properly as an energizing means for creating sufficient thrust force to move the driven gear axially.

Figure 2:
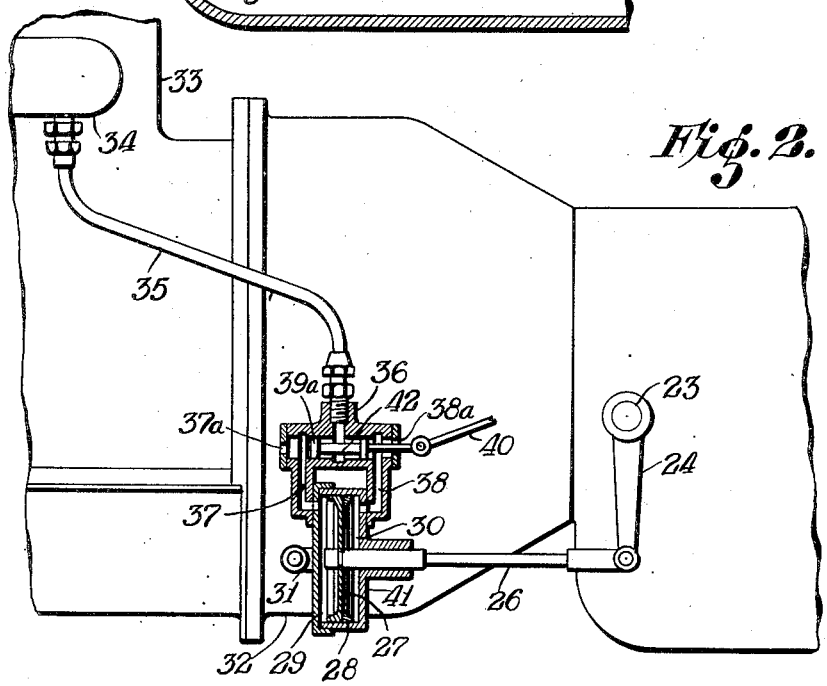
Fig. 2 is the side view of a portion of an engine, a flywheel housing, and a portion of a transmission, illustrating a controlling mechanism, which is shown in cross-section.

Any suitable means may be employed to control the shifting lever and hold it in its desired position. If the transmission is connected to an engine having an intake manifold, the vacuum in the intake manifold may be used to actuate a servo-motor. Such a servo-motor 41 is illustrated in Fig. 2. To the shifting lever is pinned a rod 26 to which is fastened a piston 27. The piston may move in a cylinder 28, the ends of which are enclosed forming a front compartment 29, and a rear compartment 30. The cylinder head 31 is pinned to a flywheel housing 32 to which the transmission housing is fastened. The flywheel housing is fastened to an engine 33, which has an intake manifold 34. A pipe 35 connects the intake manifold with a valve housing 36. A control valve 42 is employed to control the action of the servo-motor. A front pipe 37 connects the valve housing with the front compartment 29, and a rear pipe 38 connects the valve housing with the rear compartment 30. A valve 39 is slidably mounted in the valve housing. The valve housing, pipes, and valve, are so arranged that when the valve is in the center position in the valve housing, both compartments 29 and 30, by means of the front pipe 37 and the rear pipe 38, and openings 37a and 38a, are open to the atmosphere. Therefore, there is no pull on the piston 27 in either direction and the shifting lever will remain in the free-wheeling position.

If the valve is moved to its forward position, the rear compartment 30 will remain open to the atmosphere, but the front compartment 29, will be in communication with the manifold vacuum by means of the pipe 35 communicating with the front pipe 37 behind the valve head 39a. The pressure difference on the piston will force it to the left and hold it in that position which will hold the shifting lever to the left, and as has been explained, will hold the clutch in a disengaged position. Likewise, if the valve is moved to the rear position, the rear compartment 30 will communicate with the manifold vacuum and the shifting lever moved and held in the rear position which as previously explained, will hold the clutch in the engaged position for the free-wheeling lock-out.

A control rod 40 may be connected to the valve so as to move same to the desired position.

Although I have shown and described my invention in simple and practical form, it is recognized that certain parts or elements thereof are representative of other parts, elements, or mechanisms which may be used in substantially the same manner to accomplish substantially the same results; therefore it is to be understood that the invention is not to be limited to the details disclosed herein but is to be accorded the full scope of the following claims.

What I claim is:

1. In a driving mechanism the combination of a drive gear, a driven gear, a driven member, a clutch element in driving relation with said driven gear, a clutch element in driving relation with the said driven member, the said clutch elements being capable of moving into and out of engagement, meshing teeth on the said gears reacting so as to produce a thrust force when one of the said gears is driven by the other of the said gears for moving the said clutch elements into and out of engagement, and brake means automatically operable to impose a resistance to the relative rotation of said driven gear with respect to said driven member to thereby increase the thrust force reaction between said teeth of said gears, said brake means imposing a greater resistance when the drive is from the drive gear to the driven gear and less when the driven gear overruns the drive gear.

2. In a driving mechanism the combination of a drive gear, a driven gear adapted to mesh with said drive gear, a driven member, a clutch element in driving relation with said driven gear, a clutch element in driving relation with the said driven member, the said clutch elements being capable of moving into and out of engagement, teeth on the said gears arranged so as to produce a thrust force when one of the said gears is driven by the other of the said gears for moving the said clutch elements into and out of engagement, and a spring connected in braking relation with an element of the said driven gear and an element of the said driven member to increase the said thrust force when the said clutch elements are disengaged and arranged to cause greater braking action when the said thrust force is in the direction to engage the said clutch elements than when the said thrust force is in the direction to disengage the said clutch elements.

3. In a driving mechanism the combination of a drive member, a driven member, a clutch having engageable and disengageable tooth-like clutch elements operatively associated with the drive and driven members so as to control the driving relation between such members, means operatively associated with said drive and driven members for creating a force that will engage the said tooth-like clutch elements when the said drive member tends to drive the said driven member in one direction and for creating a force that will disengage the said tooth-like clutch elements when the said driven member tends to overrun the said drive member, and a one-way operable clutch for increasing the force for engaging said clutch elements over the force for disengaging the clutch elements.

4. In a driving mechanism, the combination of a drive gear, a driven gear, a driven member, a clutch element in driving relation with said driven gear, a clutch element in driving relation with the said driven member, the said clutch elements being capable of moving into and out of engagement, teeth on said gears meshing with one another and arranged so as to produce a thrust force when one of the said gears is driven by the other of the said gears for moving the said clutch elements into and out of engagement, and means for permitting or denying the operation of said thrust force and either allowing the force to function or preventing the force from functioning to thereby hold the said clutch elements either in or out of engagement.

5. In a driving mechanism, the combination of a drive member, a driven member, a member freely rotatable on one of said members, a clutch having engageable and disengageable tooth-like clutch elements on said freely rotatable member and on one of said remaining members so as to control the driving relation between such members, helical teeth on one of said members meshing with helical teeth on said freely rotatable member for producing a thrust force for engaging said clutch elements when the reaction on the helical teeth is in one direction and producing a thrust force for disengaging said clutch elements when the reaction on the helical teeth is in the other direction, and a one-way drive means operating on said freely rotatable member in such a way as to cause the reaction to occur in a clutch engaging direction only when there is no relative motion between the said clutch elements thereby preventing a clashing engagement.

6. A drive mechanism comprising, in combination, a rotatable drive member, a rotatable driven member, a clutch having engageable and disengageable clutch parts associated with the drive member and with the driven member, means operable to create a force urging the engagement of said clutch parts when said drive member tends to drive said driven member in one direction and operable to create a force urging disengagement of said clutch parts when the driven member tends to overrun said drive member, and friction means operatively interposed between the drive member and the driven member and adapted to impose a greater frictional resistance to the rotation of said drive member when the drive member tends to drive the driven member and a lesser frictional resistance when the driven member tends to overrun the drive member.

7. A drive mechanism comprising, in combination, a pair of shafts, a member freely rotatably mounted on one of said shafts, a clutch having engageable and disengageable clutch elements on said freely rotatable member and on the shaft upon which it is mounted so as to provide a driving relation therebetween, a helical gear jointly rotatable with the other shaft meshing with helical teeth on said freely rotatably mounted member for producing an axial thrust in one direction or the other direction depending upon whether the freely rotatable member is driven by the shaft with which it is meshed or tends to drive the latter, the axial thrust force produced when the freely rotatably mounted member is driven by the shaft meshing therewith acting to engage said clutch elements and the axial thrust produced in the opposite direction when the freely rotatable member tends to drive the shaft with which it is meshed acting to disengage said clutch elements, a friction retarding means operatively interposed between said freely rotatable member and the shaft upon which it is mounted and adapted to retard rotation of the former with respect to the latter when the axial thrust is in the direction to engage said clutch elements to thereby increase the axial thrust toward clutch engaging position.

8. A drive mechanism comprising, in combination, a drive member, a driven member, a member freely rotatably and axially movably mounted on said driven member, a clutch having engageable and disengageable clutch elements on said freely rotatable member and said driven member so as to provide a driving relation therebetween, a helical gear on said drive member meshing with helical teeth on said freely rotatable member and adapted to axially move the latter into clutch engagement with said driven member when the freely rotatable member is driven by the drive member and to axially move the latter out of clutch engagement with the driven member when the freely rotatable member tends to drive the drive member, and means operatively interposed between said driven member and said freely rotatable member and operable when the latter is driven by said helical gear to frictionally couple the freely rotatable member to the driven member to impose a resistance to its rotation by the helical gear to thereby increase the axial thrust imposed by the latter upon the freely rotatable member toward clutch engaging position.

9. A drive mechanism comprising, in combination, a drive shaft, a driven shaft, a member mounted on said driven shaft for rotation relative thereto and for axial movement relative thereto, clutch elements on said member and said driven shaft adapted upon axial movement of the member in one direction to engage so as to provide a driving relation therebetween and upon axial movement of the member in the opposite direction to disengage, a helical gear jointly rotatable with said drive shaft meshing with helical teeth on said member and adapted to axially move the latter into clutch engagement with said driven shaft when the member is rotatably driven by the helical gear and to axially move the member in the opposite direction out of clutch engagement with the driven shaft when the member tends to overrun the helical gear, and a frictional retarding element encircling said driven shaft and movable into position frictionally coupling the driven shaft and the member for joint rotation when the helical gear rotatably drives the member, the frictional engagement of said member and driven shaft acting to retard rotation of the member by the helical gear to thereby increase the axial thrust imposed by the helical gear on the member toward clutch engaging position.

10. A drive mechanism comprising, in combination, a drive shaft, a driven shaft, a member mounted on said driven shaft for rotation relative thereto and for axial movement relative thereto, clutch elements on said member and said driven shaft adapted upon axial movement of the member in one direction to engage so as to provide a driving relation therebetween and upon axial movement of the member in the opposite direction to disengage, a helical gear jointly rotatable with said drive shaft meshing with helical teeth on said member and adapted to axially move the latter into clutch engagement with said driven shaft when the member is rotatably driven by the helical gear and to axially move the member in the opposite direction out of clutch engagement with the driven shaft when the member tends to overrun the helical gear, a radially expansible and contractable friction element encircling the driven shaft between the same and said member and movable axially along the driven shaft with the member, said friction element tending to frictionally couple the member to the driven shaft when the member is rotated relative to the driven shaft by said helical gear and tending to release the member for relative rotation on the driven shaft when the latter overruns the member.

11. A drive mechanism comprising, in combination, a drive member, a driven member, a third member encircling said driven member and mounted thereon for both rotation and axial movement with respect thereto, a clutch having a clutch engaging part on said driven member and a cooperating clutch engaging part on said third member adapted upon movement of the latter axially along the driven member in one direction to engage and couple the two members together for joint rotation and adapted upon axial movement in the other direction to disengage said clutch parts and uncouple the members from one another, engaging helical teeth on said drive member and on said third member reacting with one another to move the latter axially into said clutch engagement when the direction of the drive is from the former to the latter and to move the latter out of said clutch engagement when the direction of the drive is from the latter to the former, said third member having an inner annular recess opening out on the driven member, a circular radially expansible and contractable friction element disposed in said recess in encircling relation to the driven member and operable to impose a frictional resistance to the relative rotation of said third member with respect to the driven member, and means providing axial movement of said element with said third member.

12. In a driving mechanism, the combination of a drive gear, a driven gear adapted to mesh with said drive gear, a driven member, a clutch element in driving relation with said driven gear, a clutch element in driving relation with said driven member, the said clutch elements being capable of moving into and out of engagement, teeth on the said gears arranged so as to produce an axial thrust force for moving said clutch elements into engagement when one of said gears is driven by the other of said gears and to produce an axial thrust force for moving said clutch elements out of engagement when the drive relation between said gears is reversed, a servo-motor for permitting or denying the operation of said axial thrust forces, and means for controlling the operation of the servo-motor.

CLIFTON R. ROCHE.

REFERENCES CITED

The following references are of record in the file of this patent:

UNITED STATES PATENTS

| Number | Name | Date |
|---|---|---|
| 1,864,613 | Philips | June 28, 1932 |
| 1,882,806 | Gillett | Oct. 18, 1932 |
| 1,920,579 | Mock | Aug. 1, 1933 |
| 2,187,835 | Martin | Jan. 23, 1940 |
| 2,219,965 | Smitt | Oct. 29, 1940 |
| 2,275,718 | Beringer | Mar. 10, 1942 |
| 2,306,543 | Burr | Dec. 29, 1942 |
| 2,320,757 | Sinclair et al. | June 1, 1943 |